United States Patent
Ozawa

(10) Patent No.: US 8,281,350 B2
(45) Date of Patent: Oct. 2, 2012

(54) CONTENT DISTRIBUTION SYSTEM, CONVERSION DEVICE, AND CONTENT DISTRIBUTION METHOD FOR USE THEREIN

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 340 days.

(21) Appl. No.: 12/530,722

(22) PCT Filed: Mar. 27, 2008

(86) PCT No.: PCT/JP2008/056634
§ 371 (c)(1),
(2), (4) Date: Sep. 10, 2009

(87) PCT Pub. No.: WO2008/117892
PCT Pub. Date: Oct. 2, 2008

(65) Prior Publication Data
US 2010/0058419 A1    Mar. 4, 2010

(30) Foreign Application Priority Data
Mar. 28, 2007    (JP) ................................. 2007-083219

(51) Int. Cl.
*H04N 7/173*    (2011.01)

(52) U.S. Cl. ............ 725/93; 725/94; 725/115; 725/116; 725/119

(58) Field of Classification Search .......... 725/114–119, 725/91–94
See application file for complete search history.

(56) References Cited

U.S. PATENT DOCUMENTS

| | | | | |
|---|---|---|---|---|
| 6,311,215 | B1 * | 10/2001 | Bakshi et al. | 709/221 |
| 7,359,731 | B2 * | 4/2008 | Choksi | 455/552.1 |
| 7,818,779 | B2 * | 10/2010 | Matsuzaki et al. | 725/143 |
| 2006/0165180 | A1 * | 7/2006 | Koyama et al. | 375/240.23 |

FOREIGN PATENT DOCUMENTS

| | | |
|---|---|---|
| CN | 1809164 A | 7/2006 |
| EP | 1633120 A2 | 3/2006 |
| EP | 1672927 A1 | 6/2006 |
| EP | 1684526 A2 | 7/2006 |
| GB | 2405297 A | 2/2005 |

(Continued)

OTHER PUBLICATIONS

Chinese Office Action for CN200880008727.7 issued Mar. 9, 2011.

(Continued)

*Primary Examiner* — Kristine Kincaid
*Assistant Examiner* — Sumaiya A Chowdhury

(57) ABSTRACT

A content distribution system distributes at least either one of a first content and a second content to a terminal (3) through a network from a distribution server (1) which stores a compression coded bit stream of the first content and a compression coded bit stream of the second content. The content distribution system has a conversion device (2) which, when a syntax indicating an order to be satisfied by the bit stream of the content distributed from said distribution server (1) to said terminal does not match a syntax of decoding information preliminarily notified to the terminal, converts the syntax of the content distributed to the terminal to match the syntax of the decoding information before distributing the same to the terminal (3). The conversion device (2) performs through processing on the content without converting the syntax thereof when the syntaxes match each other, whereas when the syntaxes do not match, the conversion device converts the syntax of the content before distributing the same to the terminal.

6 Claims, 8 Drawing Sheets

FOREIGN PATENT DOCUMENTS

| | | |
|---|---|---|
| JP | 10-191325 A | 7/1998 |
| JP | 2001175570 A | 6/2001 |
| JP | 2003006085 A | 1/2003 |
| JP | 2003289521 A | 10/2003 |
| JP | 2005005827 A | 1/2005 |
| JP | 2005033664 A | 2/2005 |
| JP | 2005278207 A | 10/2005 |
| JP | 2006203682 A | 8/2006 |
| JP | 2006246008 A | 9/2006 |
| KR | 2006-0105524 A | 10/2006 |
| WO | 2005025225 A | 3/2005 |

OTHER PUBLICATIONS

Supplementary European Search Report for EP 08 73 9744 dated Mar. 26, 2010.
Japanese Office Action for JP2009-506393 issued Aug. 24, 2011.
International Search Report for PCT/JP2008/056634 mailed May 1, 2008.
Korean Office Action for KR10-2009-7021708 issued Feb. 14, 2011.

* cited by examiner

CONTENT DISTRIBUTION SYSTEM, CONVERSION DEVICE, AND CONTENT DISTRIBUTION METHOD FOR USE THEREIN

This application is the National Phase of PCT/JP2008/056634, filed Mar. 27, 2008, which is based upon and claims the benefit of priority from Japanese patent application No. 2007-083219, filed on Mar. 28, 2007, the disclosure of which is incorporated herein in its entirety by reference.

TECHNICAL FIELD

The present invention relates to a content distribution system, a conversion device, and a content distribution method for use therein, and particularly to a method of delivering at least either one of a content (including at least one of dynamic images, static images, sound, and audio) and an advertisement content stored in a distribution server.

BACKGROUND ART

As distribution of these types of content, distribution of multimedia contents including dynamic images has recently been becoming more and more popular in broadband environment and mobile environment (see, for example, Patent Documents 1 and 2).

In addition to existing paid content distribution, free distribution also has been started. In free distribution of a video content, in particular, the video content is switched to an advertisement video content immediately after the end thereof to distribute the advertisement (See, for example, Patent Documents 3 to 5).

A method is conventionally known that switches from a video content to an advertisement video content by switching between a video server storing video contents and an advertisement server storing advertisement video contents at a certain timing.

[Patent Document 1] Japanese Unexamined Patent Application Publication No. 2005-033664

[Patent Document 2] Japanese Unexamined Patent Application Publication No. 2006-246008

[Patent Document 3] Japanese Unexamined Patent Application Publication No. 2001-175570

[Patent Document 4] Japanese Unexamined Patent Application Publication No. 2003-006085

[Patent Document 5] Japanese Unexamined Patent Application Publication No. 2003-289521

DISCLOSURE OF THE INVENTION

Problems To Be Solved by The Invention

In a distribution system as described above, where the method of switching between a video server and an advertisement server at a certain timing is employed, a series of call processing steps are performed between the distribution server and a terminal for changing an IP (Internet Protocol) address, a port number, capability information and so on in order to change the connection routes when switching the servers, and video is supplied only after completion of the call processing. This inevitably causes a problem that the processing is delayed for several seconds, for example. As a result, in this method, the end user may impatiently cut the connection.

It is therefore an object of the present invention to provide a content distribution system, a conversion device, and a content distribution method for use therein, capable of solving the problems above, and enabling a terminal to decode and display both the contents without disturbance in image.

Means for Solving The Problems

The present invention provides a content distribution system for distributing at least either one of a first content and a second content to a terminal through a network from a distribution server preliminarily storing a compression coded bit stream of said first content and a compression coded bit stream of said second content, and the content distribution system is characterized by having a conversion device which, when a syntax indicating an order to be satisfied by the bit stream of the content distributed from the distribution server to the terminal does not match a syntax of decoding information preliminarily notified to the terminal, converts the syntax of the content distributed to said terminal to match the syntax of the decoding information before distributing the same to said terminal.

Another aspect of the present invention provides a conversion device for use in a content distribution system for distributing at least either one of a first content and a second content to a terminal through a network from a distribution server storing a compression coded bit stream of said first content and a compression coded bit stream of said second content, and the conversion device is characterized by having means which, when a syntax indicating an order to be satisfied by the bit stream of the content distributed from the distribution server to the terminal does not match a syntax of decoding information preliminarily notified to the terminal, converts the syntax of the content distributed to the terminal to match the syntax of the decoding information before distributing the same to the terminal.

Still another aspect of the present invention provides a content distribution method for use in a system for distributing at least either one of a first content and a second content to a terminal through a network from a distribution server storing a compression coded bit stream of said first content and a compression coded bit stream of the second content by using a conversion device provided between the distribution server and the terminal, and the content distribution method is characterized by having in the conversion device provided between the distribution server and the terminal the steps of: converting the syntax of the content distributed to the terminal to match the syntax of decoding information preliminarily notified to the terminal when a syntax indicating a content and an order to be satisfied by the bit stream of the content distributed from the distribution server to the terminal does not match the syntax of said decoding information; and performing processing to distribute to the terminal.

The present invention having the configuration and operation as described above offers an advantageous effect that the terminal is allowed to decode and display both the contents without disturbance in image.

BEST MODE FOR CARRYING OUT THE INVENTION

Figure 1:
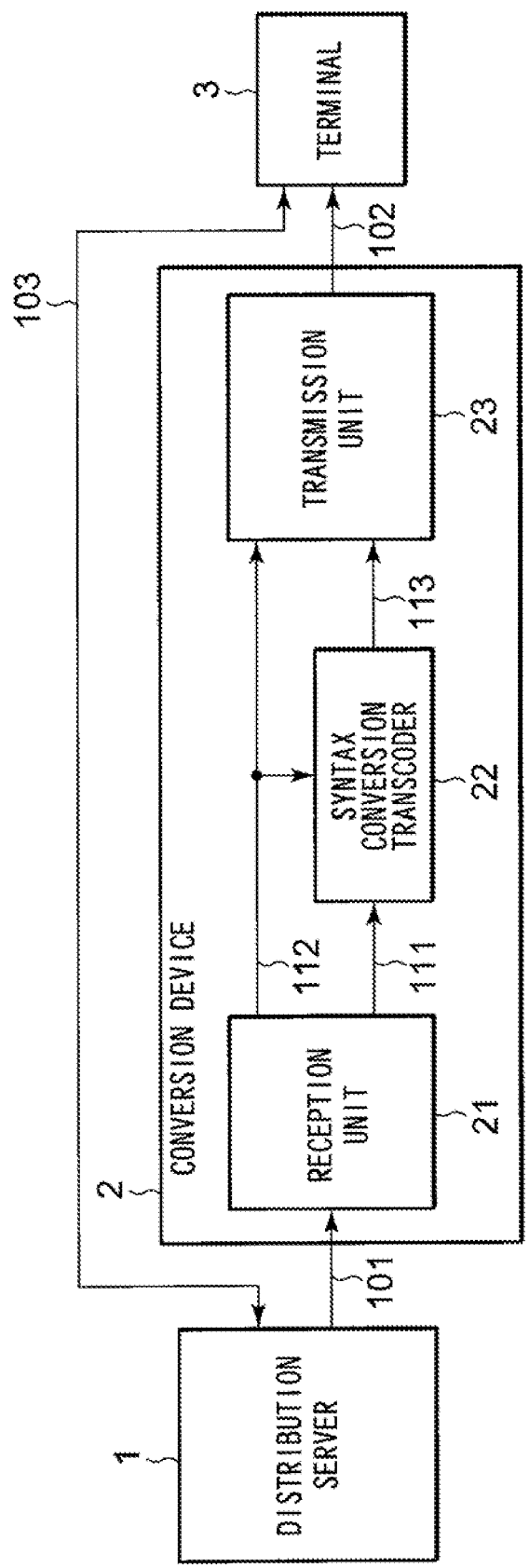
FIG. 1 is a block diagram showing an example of configuration of a content distribution system according to a first exemplary embodiment of the present invention.

A content distribution system according to the present invention is a content distribution system for distributing, from a distribution server which preliminarily stores a compression coded bit stream of a content including dynamic images and a compression coded bit stream of an advertisement content, at least either one of the content including dynamic images and the advertisement content to a terminal via a network. The content distribution system has a conversion device which, when a syntax indicating the contents and order to be at least satisfied by the bit stream in the content distributed from the distribution server to the terminal does not match a syntax of decoding information preliminarily notified to the terminal, converts the syntax of the content distributed to the terminal to match the syntax of the decoding information before distributing the content to the terminal.

Description herein will be made with the content including dynamic images referred to as first content and the advertisement content referred to as second content. However, the second content is not necessarily be an advertisement content. The advertisement content may include animation.

A conversion device according to the present invention is a conversion device for use in a content distribution system for distributing, from a distribution server which preliminarily stores a compression coded bit stream of a content including dynamic images and a compression coded bit stream of an advertisement content, at least either one of the content including dynamic images and the advertisement content to a terminal via a network. The conversion device has a means which, when a syntax indicating the contents and order to be at least satisfied by the bit stream in the content distributed from the distribution server to the terminal does not match a syntax of decoding information preliminarily notified to the terminal, converts the syntax of the content distributed to the terminal to match the syntax of the decoding information before distributing the content to the terminal.

A content distribution method according to the present invention is a content distribution method for use in a system for distributing, from a distribution server which preliminarily stores a compression coded bit stream of a content including dynamic images and a compression coded bit stream of an advertisement content, at least either one of the content including dynamic images and the advertisement content to a terminal via a network. According to the content distribution method, when a syntax indicating the contents and order to be at least satisfied by the bit stream in the content distributed from the distribution server to the terminal does not match a syntax of decoding information preliminarily notified to the terminal, a conversion device provided between the distribution server and the terminal converts the syntax of the content distributed to the terminal to match the syntax of the decoding information before distributing the content to the terminal.

In other words, the present invention provides a content distribution system which is designed to distribute at least either one of a content (including at least one of dynamic images, static images, sound, and audio) and an advertisement content stored in a distribution server, or designed to receive positional information when a terminal is moved and distribute at least either one of the content or the advertisement content by switching between them, and the system according to the present invention is capable of distributing a video content and then distributing another video content (e.g., advertisement) at predetermined timings in a same session without switching the distribution server.

Specifically, the content distribution system according to the present invention is provided with a conversion device including a syntax conversion transcoder (video transcoder) so that, if necessary, the conversion device converts in real time the syntax (contents and order to be satisfied by a bit stream) of the video content to be distributed, whereby the switching between the contents is made possible without causing time delay due to switching between distribution servers.

More specifically, in the content distribution system of the present invention, when a video content (for example, dynamic image content) to be distributed from the distribution server to a terminal is switched to another video content (for example, advertisement content or the like), or another video content (for example, advertisement content or the like) is inserted into the video content, the syntax conversion transcoder provided in the conversion device converts the syntax of the video content stream or the syntax of the another video content stream to match capability information previously transmitted from the conversion device to the terminal.

According to the content distribution system of the present invention, when video content and another video content (for example, advertisement content) are distributed in a same session from the distribution server to a terminal, a conversion control unit determines whether the capability information of the video content and the another content is identical with capability information [particularly, DCI (Decoder Configuration Information) information] notified to the terminal at the start of the session.

If both the capability information is identical to each other, the content distribution system of the present invention performs through processing on the video content and the another content without converting the syntax thereof.

On the other hand, if the syntax of at least either one of the video content and the another content is different from the capability information notified to the terminal, the content distribution system of the present invention uses the syntax conversion transcoder provided in the conversion device to convert the syntax of the differing content to match the DCI information notified to the terminal, and then transmits the converted content stream to the terminal.

Thus, when video content and another video content (for example, advertisement content) are distributed temporally sequentially in a same session in the content distribution system of the present invention, even if the decoding information of the video content is different from the decoding information of the another video content (for example, advertisement content), the syntax conversion transcoder performs syntax conversion so that the syntaxes of the contents become the same. This enables the terminal to decode and display both the contents without disturbance in image.

Further, when distribution of a video content is followed by distribution of another content, the content distribution system of the present invention, in which the syntax conversion transcoder performs syntax conversion, has an advantageous effect that shorter time is required to switch from the video content to the another video content in comparison with the prior art.

Further, according to the content distribution system of the present invention, when the terminal is moved to change its regional location, the syntax conversion transcoder performs syntax conversion so that the syntaxes of the contents become the same even if the advertisement content is switched in conjunction with positional information of the terminal, or even if the decoding information of the video content is different from the decoding information of the another video content (for example, advertisement content). Thus, the content distribution system of the present invention offers advantageous effects that the terminal is enabled to decode and display both the contents without disturbance in image, and the time required to switch to the advertisement content can be shortened.

Exemplary embodiments of the present invention will be described with reference to the drawings.

First Exemplary Embodiment

FIG. 1 is a block diagram showing an example of configuration of a content distribution system according to a first exemplary embodiment of the present invention. In FIG. 1, the content distribution system according to the first exemplary embodiment of the present invention is composed of a distribution server 1, a conversion device 2, a terminal 3, and transmission lines 101 to 103.

Figure 8:
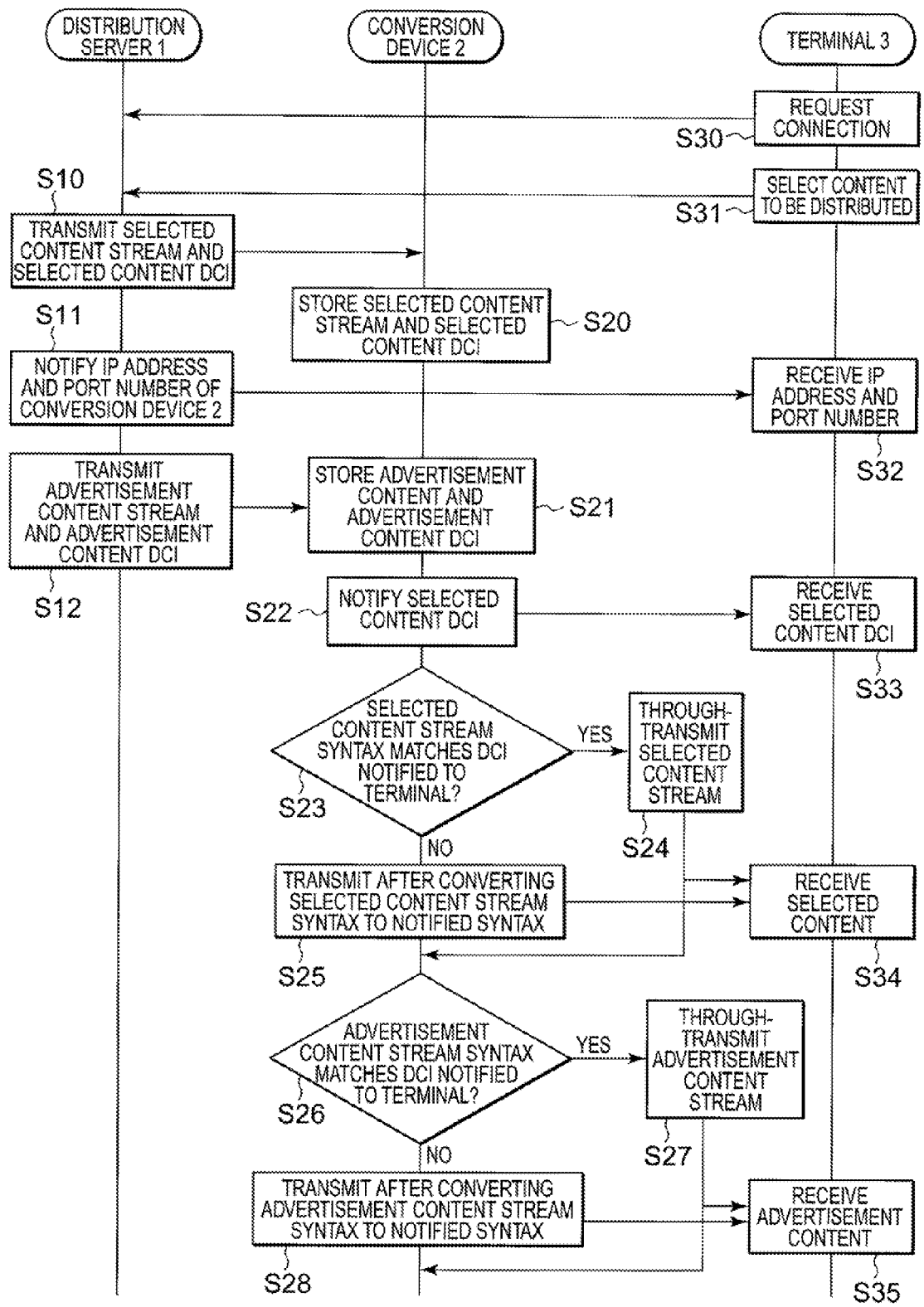
FIG. 8 is a flowchart showing operation of the content distribution system shown in FIG. 1.

Referring to FIG. 8 together with FIG. 1, the distribution server 1 previously stores a compression coded bit stream of a content including dynamic images and a compression coded bit stream of an advertisement content. When distribution is desired, the terminal 3 makes a connection request to the distribution server 1 through the transmission line 103 (S30 in FIG. 8), and selects at least one content to be distributed (S31).

The distribution server 1 transmits to the conversion device 2 a compression coded stream of the at least one content selected by the terminal 3 together with decoding information of that content, for example, DCI (Decoder Configuration Information) information (S10). The distribution server 1 also notifies the terminal 3 of a connection method to the conversion device 2, for example, IP (Internet Protocol) address or port number through the transmission line 103 (S11).

The distribution server 1 then transmits to the conversion device 2 through the transmission line 101 another video content (for example, advertisement video content) and decoding information related thereto in a same session and temporally sequentially to the selected content, or at a predetermined timing in a same session as the selected content (S12).

The conversion device 2 is composed of a reception unit 21, a syntax conversion transcoder 22, and a transmission unit 23. The conversion device 2 receives, from the reception unit 21, decoding information of the selected content, for example, DCI, or predetermined decoding information, for example, predetermined DCI information, and notifies the terminal 3 of the same via the transmission unit 23 through the transmission line 102 (S22).

When the transmission line 102 is of a line switching network, the decoding information is transmitted to the terminal 3 using ITU-T (International Telecommunication Union-Telecommunication Standardization Sector) recommendation H.245 protocol. When the transmission line 102 is of a packet switching network, the decoding information is notified to the terminal 3 by describing the decoding information with IETF (Internet Engineering Task Force) SDP (Session Description Protocol) protocol [IETF RFC (Request For Comments) 2327, RFC3264, RFC3984]. Further, when the transmission line 102 is for packet switching, either the unicast distribution method or the multicast distribution method can be employed.

The syntax conversion transcoder 22 receives the selected video content stream, and determines whether or not the content syntax (contents and order to be satisfied by the bit stream) matches the syntax of the decoding information previously notified to the terminal 3 (S23). If it determined that they match, the syntax conversion transcoder 22 outputs the selected video content stream to the transmission unit 23 by through processing without performing conversion processing (S24).

If it is determined that they don't match, in contrast, the syntax conversion transcoder 22 converts the syntax of the selected content stream to match the capability information, and outputs the converted stream to the transmission unit 23. The transmission unit 23 transmits the content stream received from the syntax conversion transcoder 22 to the terminal 3 (S25).

The syntax conversion transcoder 22 then checks decoding information of another video content (for example, advertisement content) received following the selected content and the compression coded stream of the another video content (for example, advertisement content) to determine whether or not the decoding information matches the syntax of the decoding information previously notified to the terminal 3 (S26). If the decoding information matches, the syntax conversion transcoder 22 transmits the stream of the another content (for example, advertisement content) to the transmission unit 23 by through processing without conducting conversion processing on the stream (S27).

If the decoding information does not match, in contrast, the syntax conversion transcoder 22 converts the syntax of the compression coded stream of the another content (for example, advertisement content) to match the decoding information, and outputs the converted stream to the transmission unit 23. The transmission unit 23 transmits the compression coded stream to the terminal 3 (S28).

An operational example of the syntax conversion transcoder 22 will be described with reference to FIGS. 2 to 6. Although the following description of the operational example will be made taking an example of MPEG-4 (Moving Picture Expert Group-4), the present invention is not limited to this MPEG-4, but is also applicable to other dynamic image compression coding schemes.

Figure 2:
FIG. 2 is a diagram showing configuration of a video packet in an intra-frame coded VOP (I-VOP) when only ResyncMarker is used as a coding tool in MPEG-4 Visual.

FIG. 2 shows a configuration of a video packet in I-VOP (Intra-frame coded Video Object Plane) in which only ResyncMarker (resynchronization marker) is used as a coding tool. In FIG. 2, it is assumed that the video packet includes from m-th to n-th MBs (Macro Blocks).

DC (direct current) component (m) means a bit string of information required for decoding the DC component of the m-th MB (encoding mode, quantized prediction error, and DC component). AC control (m) means a bit string of information required for decoding the AC component of the m-th MB (encoding pattern and AC prediction flag). AC component (m) means a bit string of the AC component of the m-th MB. The term "AC component" as used herein is any other component than a direct current component of a DCT (Discrete Cosine Transform) transformed coefficients.

Figure 3:
FIG. 3 is a diagram showing a configuration of a video packet in predicted inter-frame coded VOP (P-VOP) when only ResyncMarker is used as a coding tool in MPEG-4 Visual.

FIG. 3 shows configuration of a video packet in P-VOP (inter-frame forward predictive coded VOP) in which only ResyncMarker is used as a coding tool. MV (Motion Vector) component (m) means a bit string of information required for decoding motion vectors (decoded MB flag, encoding mode, and MV). AC control (m) means a bit string of information required for decoding an AC component (encoding pattern, AC prediction flag, and quantized prediction error). AC component (m) means an AC component bit string.

Figure 4:
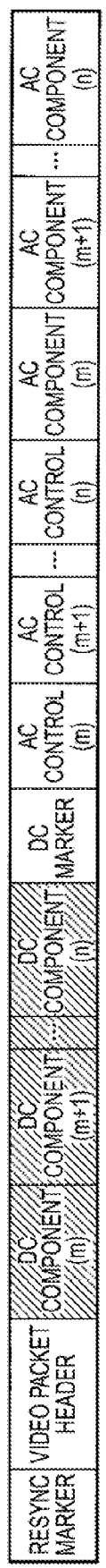
FIG. 4 is a diagram showing a configuration of a video packet in an I-VOP when Data Partitioning is used in addition to ResyncMarker as a coding tool in MPEG-4 Visual.

FIG. 4 shows a configuration of a video packet in I-VOP in which Data Partitioning is used in addition to ResyncMarker as a coding tool. The meanings of the DC component, the AC control, and the AC component are the same as in FIG. 2.

Data (bit strings) relating to the MBs are the same as those in FIG. 2, except that whereas the bit strings are arranged in units of MBs in FIG. 2, the bit strings are arranged in descending order of importance of the data in FIG. 4. A DC Marker is inserted between a DC component and an AC control. When RVLC [Reversible VLC (Variable Length Coding)] is used in addition to the described above, the AC component is coded using a RVLC code table instead of an ordinary VLC code table.

Figure 5:
FIG. 5 is a diagram showing a configuration of a video packet in a P-VOP when Data Partioning is used in addition to ResyncMarker as a coding tool in MPEG-4 Visual.

FIG. 5 shows a configuration of a video packet in P-VOP in which Data Partitioning is used in addition to ResyncMarker as a coding tool. Meanings of MV component, AC control, and AC component are the same as in FIG. 3. Data (bit strings) relating to the MBs are the same as those in FIG. 3, except that whereas the bit strings are arranged in units of MBs in FIG. 3, the bit strings are arranged in descending order of importance of the data in FIG. 5.

Further, a Motion Marker is inserted between a MV component and an AC control. When ReversibleVLC is used in addition to the described above, the AC component is coded using a RVLC code table instead of an ordinary VLC code table.

Figure 6:
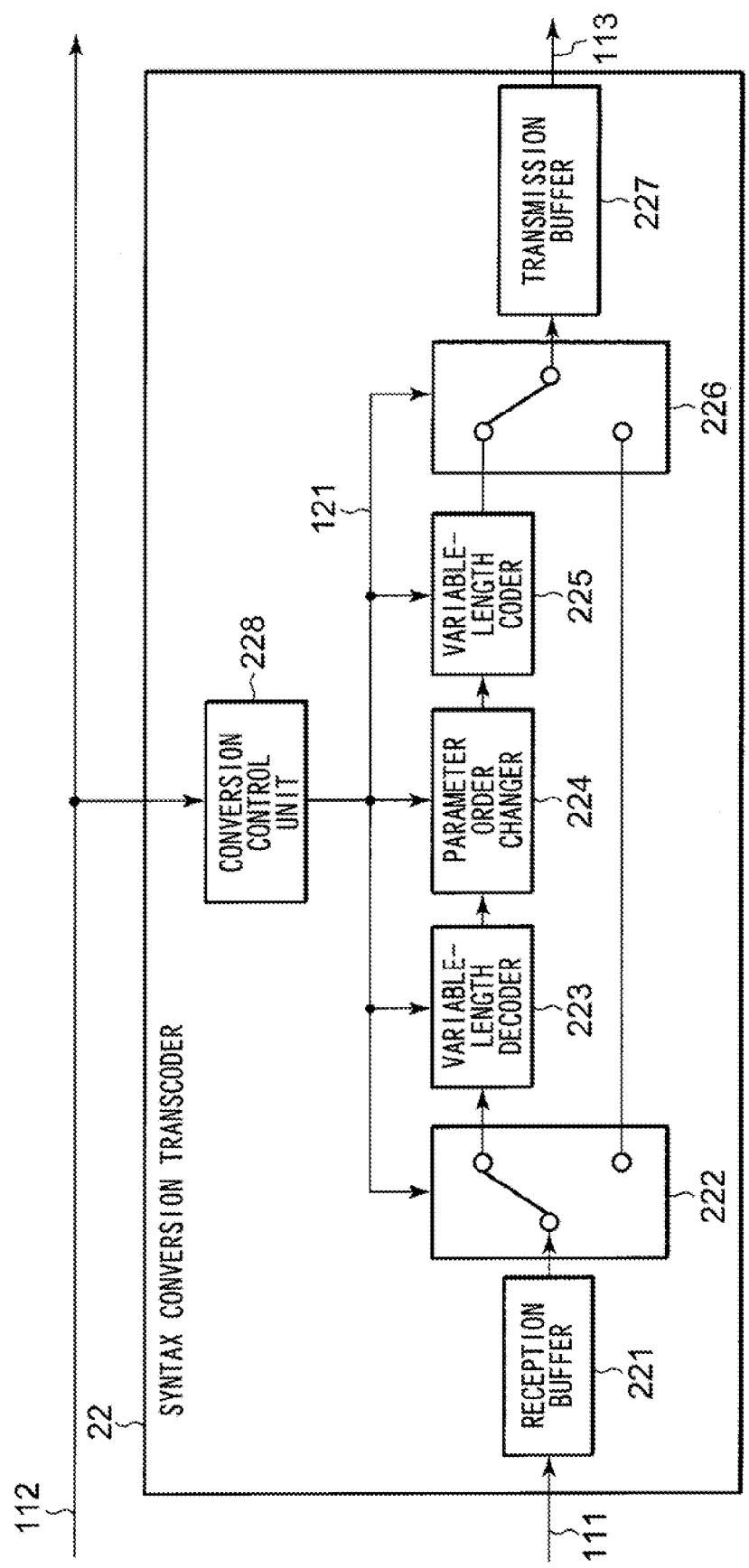
FIG. 6 is a block diagram showing a configuration of the syntax conversion transcoder in FIG. 1.

FIG. 6 is a block diagram showing a detailed configuration of the syntax conversion transcoder 22 of FIG. 1. In FIG. 6, the syntax conversion transcoder 22 is composed of a reception buffer 221, conversion on/off switches 222 and 226, a variable-length decoder 223, a parameter order changer 224, a variable-length coder 225, a transmission buffer 227, and a conversion control unit 228.

The reception buffer 221 once stores a video packet 111 received from the reception unit 21, and outputs the video packet to the conversion on/off switch 222 according to conversion control information 121.

The conversion on/off switch 222 has a function to switch whether the syntax in the video packet output by the reception buffer 221 is to be converted or not according to the conversion control information 121 notified by the conversion control unit 228. When the syntax in the video packet output by the reception buffer 221 is to be converted, the conversion on/off switch 222 outputs the video packet output by the reception buffer 221 to the variable-length decoder 223. When the syntax in the video packet output by the reception buffer 221 is not to be converted, the conversion on/off switch 222 outputs the video packet output by the reception buffer 221 to the conversion on/off switch 226.

The variable-length decoder 223 performs variable-length decoding processing on parameters other than the AC component in the video packet output by the conversion on/off switch 222, by using an ordinary VLC code table. The variable-length decoder 223 also has a function of controlling the variable-length decoding processing according to the conversion control information 121 notified by the conversion control unit 228.

Further, the variable-length decoder 223 performs the variable-length decoding processing on the AC component by using the ordinary VLC code table when Reversible VLC is not used, and by using the RVLC code table when Reversible VLC is used.

The parameter order changer 224 changes the order of arrangement of the bit strings based on the result of the variable-length decoding performed by the variable-length decoder 223 on the video packet output by the conversion on/off switch 222. The parameter order changer 224 also has a function of controlling the processing to change the arrangement order of the bit strings according to the conversion control information 121 notified by the conversion control unit 228.

When the video packet output by the conversion on/off switch 222 has the pattern of FIG. 2, the parameter order changer 224 changes it to the pattern of FIG. 4 while inserting a DC Marker. When the video packet output by the conversion on/off switch 222 has the pattern of FIG. 3, the parameter order changer 224 changes it to the pattern of FIG. 5 while inserting a Motion Marker.

When the video packet output by the conversion on/off switch 222 has the pattern of FIG. 4, the parameter order changer 224 changes it to the pattern of FIG. 2 while deleting the DC Marker. When the video packet output by the conversion on/off switch 222 has the pattern of FIG. 5, the parameter order changer 224 changes it to the pattern of FIG. 3 while deleting the Motion Marker.

The variable-length coder 225 performs variable-length coding processing only on the AC component. The variable-length coder 225 also has a function to control the variable-length coding processing according to the conversion control information 121 notified by the conversion control unit 228. The variable-length coder 225 performs the variable-length coding processing by using the ordinary VLC code table when Reversible VLC is not used, and by using the RVLC code table when Reversible VLC is used.

The conversion on/off switch 226 has a function to switch whether the syntax in the video packet output by the reception buffer 221 is to be converted or not according to the conversion control information 121 notified by the conversion control unit 228. When the syntax in the video packet output by the reception buffer 221 is to be converted, the conversion on/off switch 226 outputs the video packet output by the variable-length coder 225 to the transmission buffer 227. When the syntax in the video packet output by the reception buffer 221 is not to be converted, the conversion on/off switch 226 outputs the video packet output by the conversion on/off switch 222 to the transmission buffer 227.

The transmission buffer 227 once stores the video packet output by the conversion on/off switch 226, and transmits the same as dynamic image data 113 to the transmission unit 23. The conversion control unit 228 refers to the decoding information 112 received from the reception unit 21 to determine whether or not the syntax in the video packet output by the reception buffer 221 is to be converted. The conversion control unit 228 outputs the conversion control information 121 to the conversion on/off switches 222, 226, the variable-length decoder 223, the parameter order changer 224, and the variable-length coder 225 based on the determination result.

In this exemplary embodiment, when a video content (for example, dynamic image content) to be transmitted from the distribution server 1 to the terminal 3 is switched to another video content (for example, advertisement content or the like), or has another video content (for example, advertisement content or the like) inserted thereinto, the syntax conversion transcoder 22 of the conversion device 2 converts the syntax of the video content stream or the syntax of the another video content stream to match the capability information previously transmitted from the conversion device 2 to the terminal 3.

When the distribution server 1 distributes to the terminal 3 the video content and the another video content (for example, advertisement content) in a same session, the conversion control unit 228 determines whether or not the capability information of the video content and the another content are the same as the capability information (DCI information, in particular) notified to the terminal 3 at the start of the session.

According to this exemplary embodiment, when the capability information of a video content and another content is the same as the capability information notified to the terminal 3, through processing is performed without converting the syntax of the video content or the syntax of the another content.

In contrast, when at least either one of the syntax of the video content and the syntax of the another content is different from the capability information notified to the terminal 3, the dynamic image transcoder (syntax conversion transcoder 22) provided in the conversion device 2 is used to convert the differing syntax of the contents to match the DCI information notified to the terminal 3, and then the converted content stream is transmitted to the terminal 3.

In this exemplary embodiment, when a video content and another video content (for example, advertisement content) are distributed temporally sequentially in a same session, the terminal 3 is allowed to decode and display both of the contents without disturbance in the images even if the decoding information of the video content is different from that of the another video content (for example, advertisement content), since the syntax conversion transcoder 22 converts the syntax of the contents to be identical to each other.

Further, according to this exemplary embodiment, the video transcoder (syntax conversion transcoder 22) performs syntax conversion when distribution of a video content is followed by distribution of another content. Therefore, the time required to switch from the video content to the another video content can be made shorter in comparison with the related art.

Second Exemplary Embodiment

Figure 7:
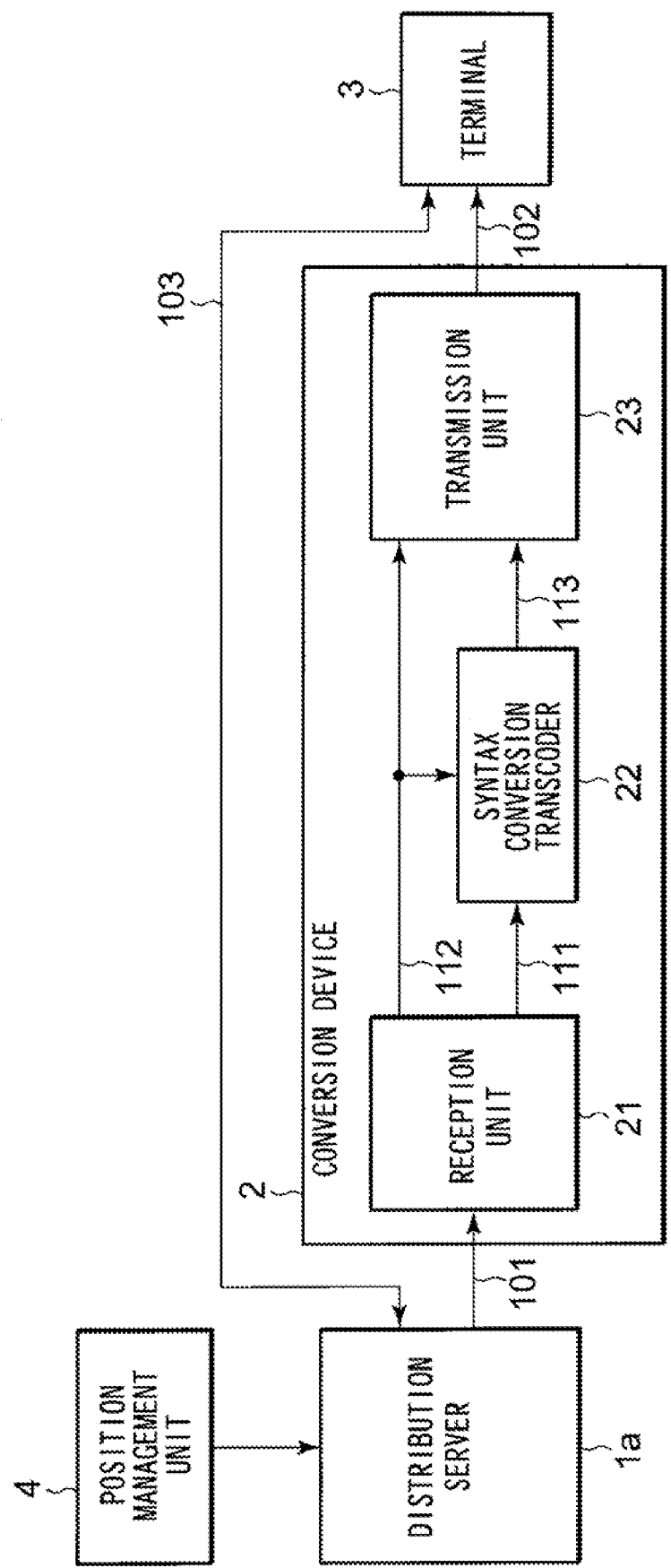
FIG. 7 is a block diagram showing an example of configuration of a content distribution system according to a second exemplary embodiment of the present invention.

FIG. 7 is a block diagram showing an example of configuration of a content distribution system according to another embodiment of the present invention. This embodiment shown in FIG. 7 has same configuration as the content distribution system according to the first exemplary embodiment shown in FIG. 1 except that a position management unit 4 is additionally provided, and like components are denoted by like numerals. Further, since operation of the components is similar to that of the counterparts of the first exemplary embodiment of the present invention, description thereof will be omitted.

The position management unit 4 manages where the position of the terminal 3 is located. When the terminal 3 is a mobile terminal connected, for example, to a 3G (3rd Generation) mobile network, the position management unit 4 manages the position of the terminal 3 based on information from a HLR (Home Location Register) (database holding service subscription information, positional information, authentication information and so on), and a HSS (Home Subscriber Server) [(server having, in addition to the HLR function, a subscriber identification function, a user authentication function and other functions required for IMS (IP Multimedia Subsystem)].

When the terminal 3 is connected to a W-LAN (Wideband-Local Area Network), for example, it is conceivable that the position management unit 4 manages information from an access point.

It is assumed, for example, that a distribution server 1a classifies the whole country into a plurality of regions and stores an advertisement content for each of the regions in advance. The distribution server 1a checks positional information transmitted by the position management unit 4. When the terminal 3 is moved to change its location and enters a predetermined region, the distribution server 1a is able to switch the advertisement content to an advertisement content specific to that region, and to output decoding information of the advertisement content onto the transmission line 103 while outputting the advertisement content to the transmission unit 23.

In this exemplary embodiment, as described above, when the terminal 3 is moved to change its regional location and the advertisement content is switched in conjunction with the change in location, or if decoding information of a video content is different from decoding information of another video content (for example, advertisement content), the syntax conversion transcoder 22 converts the syntax of the contents to match each other. This enables the terminal 3 to decode and display both the video content and the another content without disturbance in image, and the time required for switching to the advertisement content can be shortened.

Although the present invention has been described based on the embodiments above, the present invention is not limited to these embodiments. The present invention should be understood in wider sense to embrace other embodiments and modifications that will occur to those skilled in the art without departing from the scope and equivalent scope of the invention.

This application is based upon and claims the benefit of priority from Japanese patent application No. 2007-083219, filed on Mar. 28, 2007, the disclosure of which is incorporated herein in its entirety by reference.

The invention claimed is:

1. A content distribution system for distributing content to a terminal through a network comprising:

a distribution server for preliminarily storing multiple contents each in a compression coded bit stream and providing a selected one of the multiple contents in response to selection of content by the terminal and another one of the multiple contents sequentially following the selected one; and a conversion device capable of converting a compressed coded bit stream to another compressed coded bit stream, wherein the conversion device, in response to reception of the selected one from the distribution server, preliminarily notifies the terminal of decoding information of the selected one, transmits to the terminal the selected one in a compressed bit stream in syntax according to the decoding information of the selected one, and transmits to the terminal the another one of the multiple contents, sequentially following the selected one, in a compressed coded bit stream in syntax according to the decoding information of the selected one that has been preliminarily notified to the terminal, when the decoding information of the another one of the multiple contents does not match the decoding information of the selected one that has been preliminarily notified to the terminal, while transmits the another one of the multiple contents without syntax conversion when the decoding information of the another one of the multiple contents matches the decoding information of the selected one that has been preliminarily notified to the terminal, and wherein the another one of the multiple contents comprises an advertisement content.

2. The content distribution system according to claim 1, wherein the distribution server provides to the conversion device, upon receiving a connection request from the terminal, the selected one of the multiple contents and the another one of the multiple contents sequentially to each other or at predetermined timings in a same session.

3. The content distribution system according to claim 1, wherein, when the terminal is moved, the distribution server switches at least either one of said selected one and the another one of the multiple contents to a third content based on positional information of said terminal and distributes the same.

4. A content distribution method for use in a system for distributing content to a terminal through a network, the content distribution method comprising:

preliminarily storing in a distribution server multiple contents each in a compression coded bit stream;

providing to a conversion device a selected one of the multiple contents in response to selection of content by the terminal and another one of the multiple contents sequentially following the selected one, wherein the conversion device is capable of converting a compressed coded bit stream to another compressed coded bit stream;

notifying the terminal of decoding information of the selected one in response to the selection of content by the terminal, transmitting to the terminal the selected one in a compressed coded bit stream in syntax according to the decoding information of the selected one, transmitting to the terminal the another one of the multiple contents, sequentially following the selected one, in a compressed coded bit stream in syntax according to the decoding information of the selected one that has been preliminarily notified to the terminal, when the decoding information of the another one of the multiple contents does not match the decoding information of the selected one, while transmitting the another one of the multiple contents without syntax conversion when the decoding information of the another one of the multiple contents matches the decoding information of the selected one, and wherein the another one of the multiple contents comprises an advertisement content.

5. The content distribution method according to claim 4, wherein the distribution server provides, upon receiving a connection request from said terminal, the selected one of the multiple contents and the another one of the multiple contents sequentially to each other or at predetermined timings in a same session after preliminarily notifying said terminal of said decoding information of the selected one.

6. The content distribution method according to claim 4, wherein, when the terminal is moved, said distribution server switches at least either one of said selected one and the another one of the multiple contents to a third content based on positional information of said terminal and distributing the same.

* * * * *